A. R. PRIBIL.
POTATO PLANTER.
APPLICATION FILED AUG. 2, 1910.

1,008,925.

Patented Nov. 14, 1911.
5 SHEETS—SHEET 4.

Witnesses

Alexis R. Pribil, Inventor,

By

Attorney

A. R. PRIBIL.
POTATO PLANTER.
APPLICATION FILED AUG. 2, 1910.
1,008,925.
Patented Nov. 14, 1911.
5 SHEETS—SHEET 5.
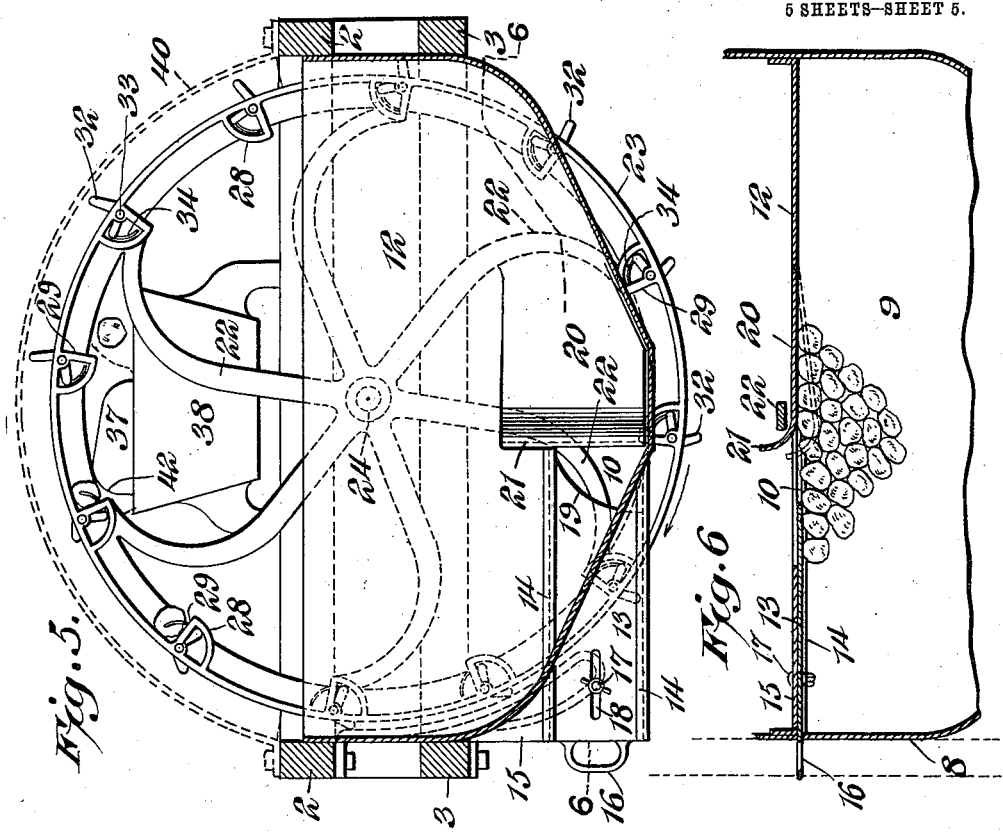
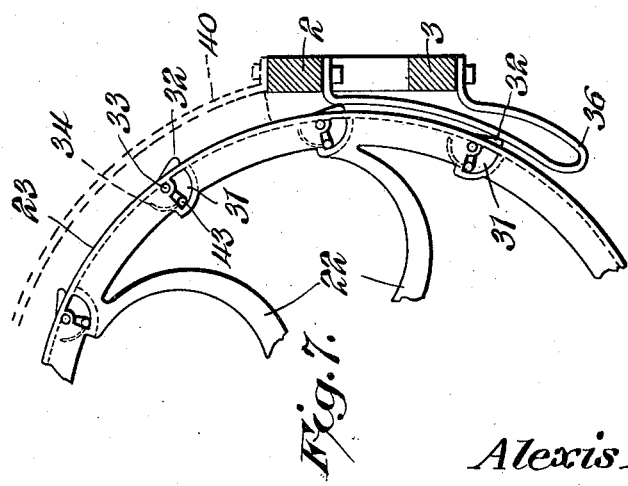
Alexis R. Pribil, Inventor
Witnesses
By
Attorney

UNITED STATES PATENT OFFICE.

ALEXIS R. PRIBIL, OF DETROIT, MICHIGAN, ASSIGNOR TO UNIVERSAL IMPLEMENT COMPANY, OF ORION, MICHIGAN, A CORPORATION OF MICHIGAN.

POTATO-PLANTER.

1,008,925.

Specification of Letters Patent.

Patented Nov. 14, 1911.

Application filed August 2, 1910. Serial No. 575,121.

*To all whom it may concern:*

Be it known that I, ALEXIS R. PRIBIL, a citizen of the United States, residing at Detroit, in the county of Wayne and State of Michigan, have invented a new and useful Potato-Planter, of which the following is a specification.

The invention relates to improvements in potato planters.

The object of the present invention is to simplify and improve the construction of that type of two row potato planters employing a hopper, and a vertical rotary pick-up or feed wheel for conveying the seed potatoes to a horizontal rotary carrier, and to increase the strength, durability and efficiency of such machines and lessen their cost of manufacture.

A further object of the invention is to improve the construction of feeding mechanism to insure a positive discharge of seed potatoes from the hopper to the rotary feed or pick-up wheel and prevent the potatoes from wedging around the latter and clogging the same.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

Figure 1:
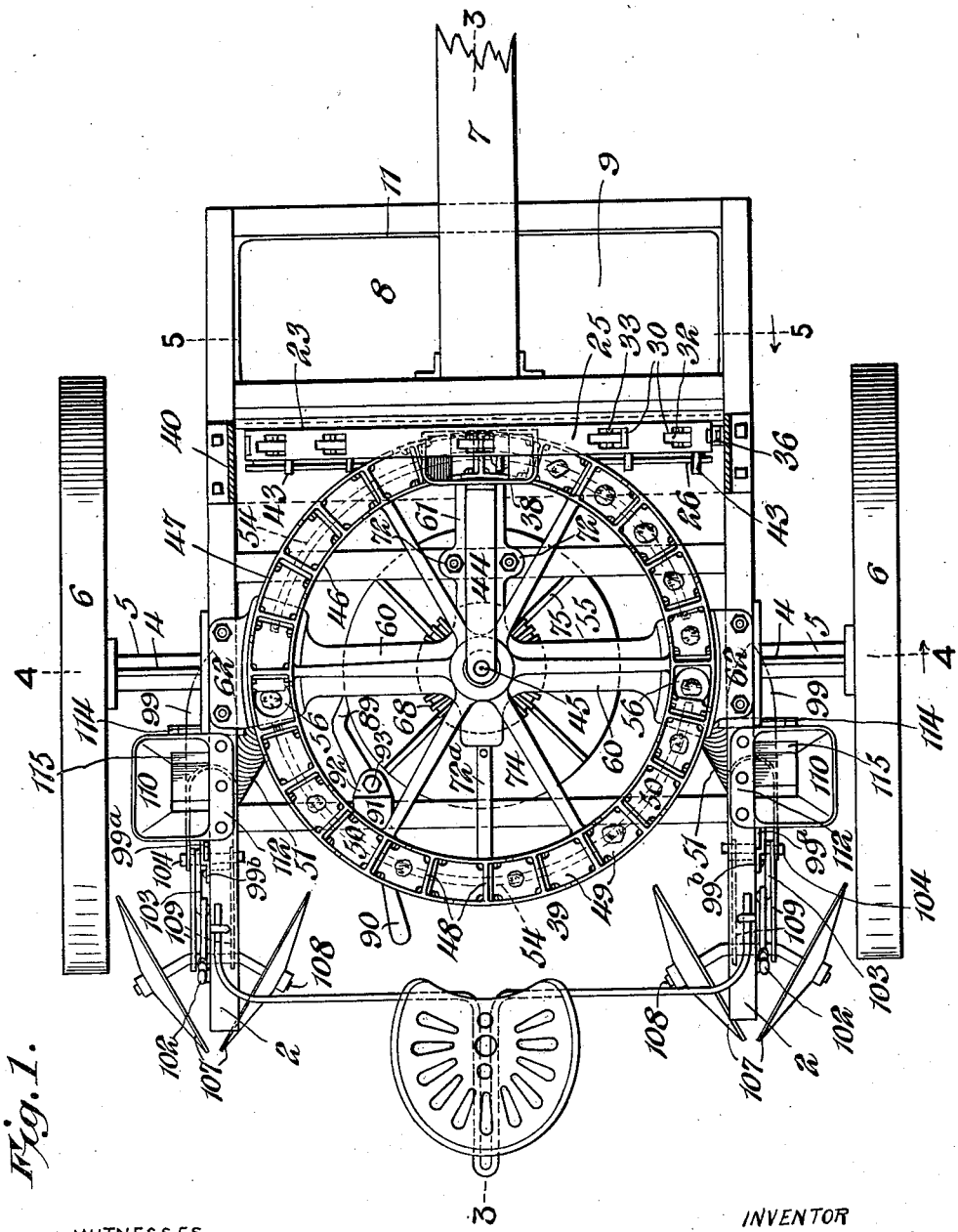
Figure 2:
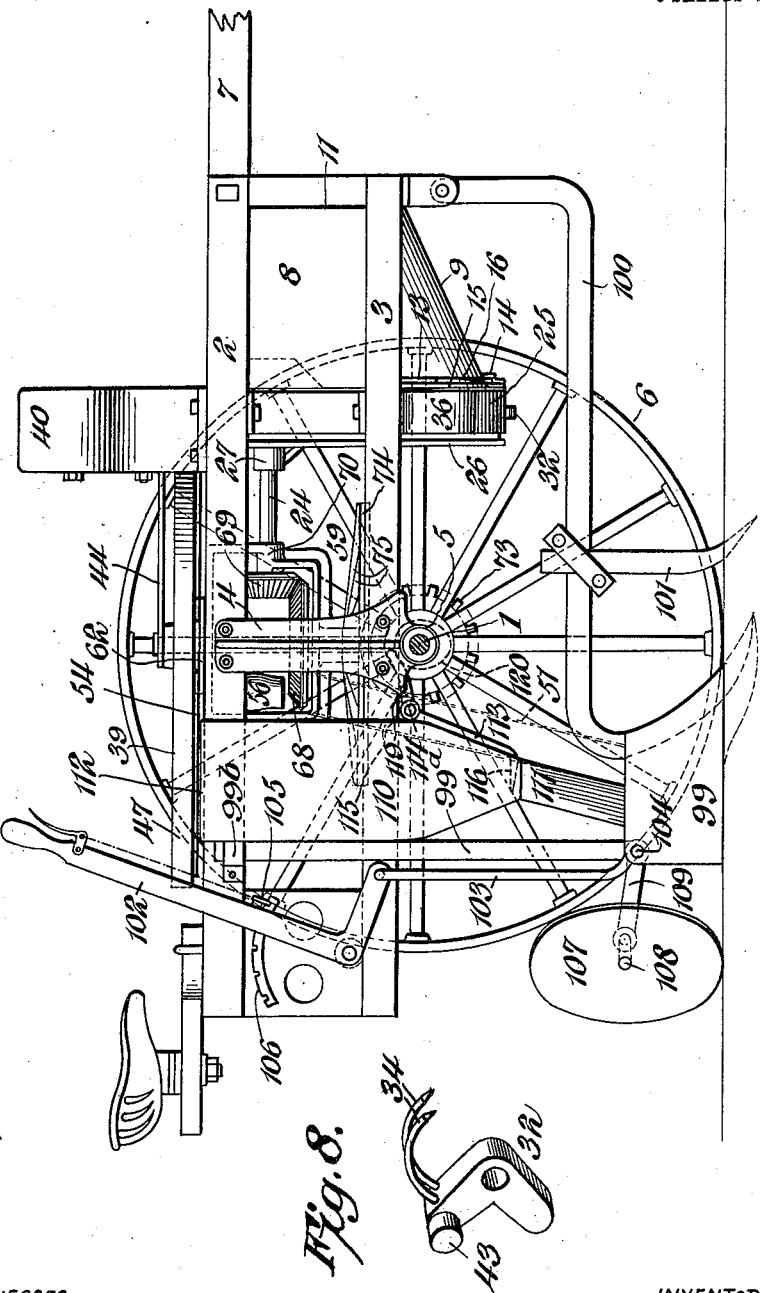
Figure 3:
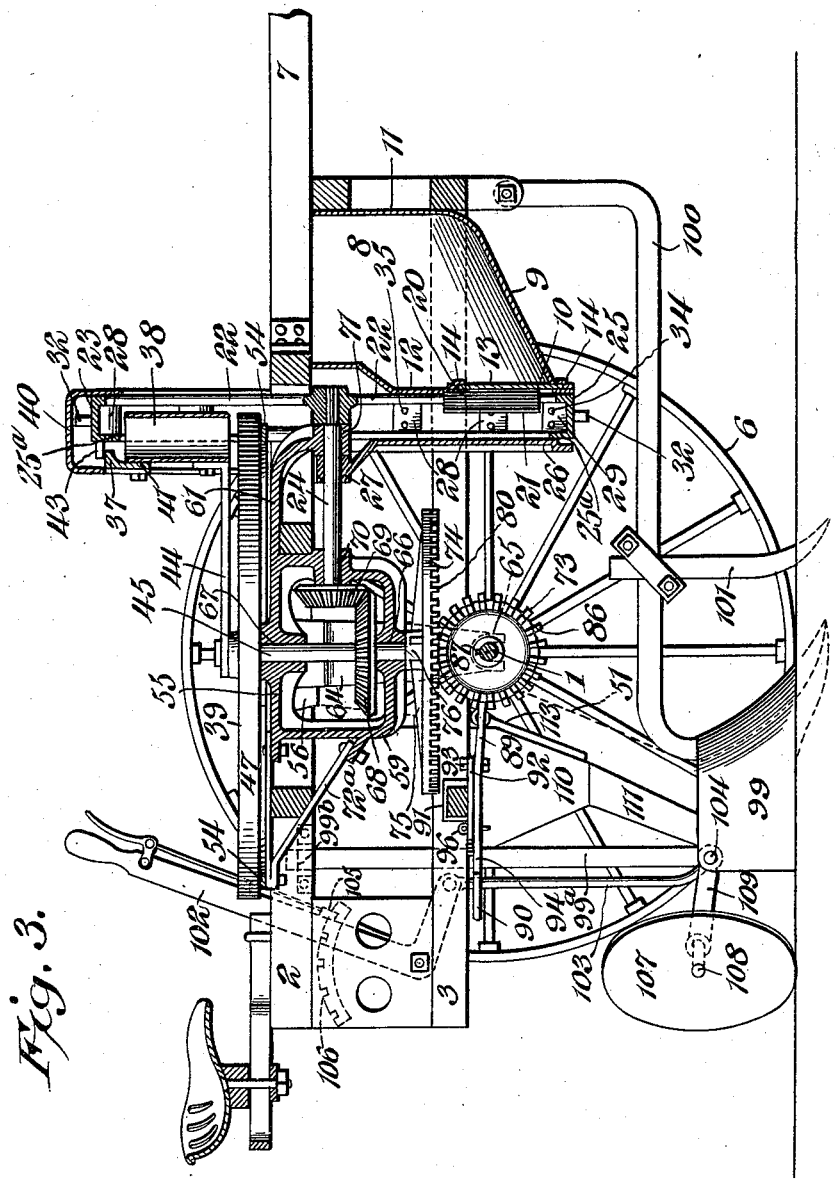
Figure 4:
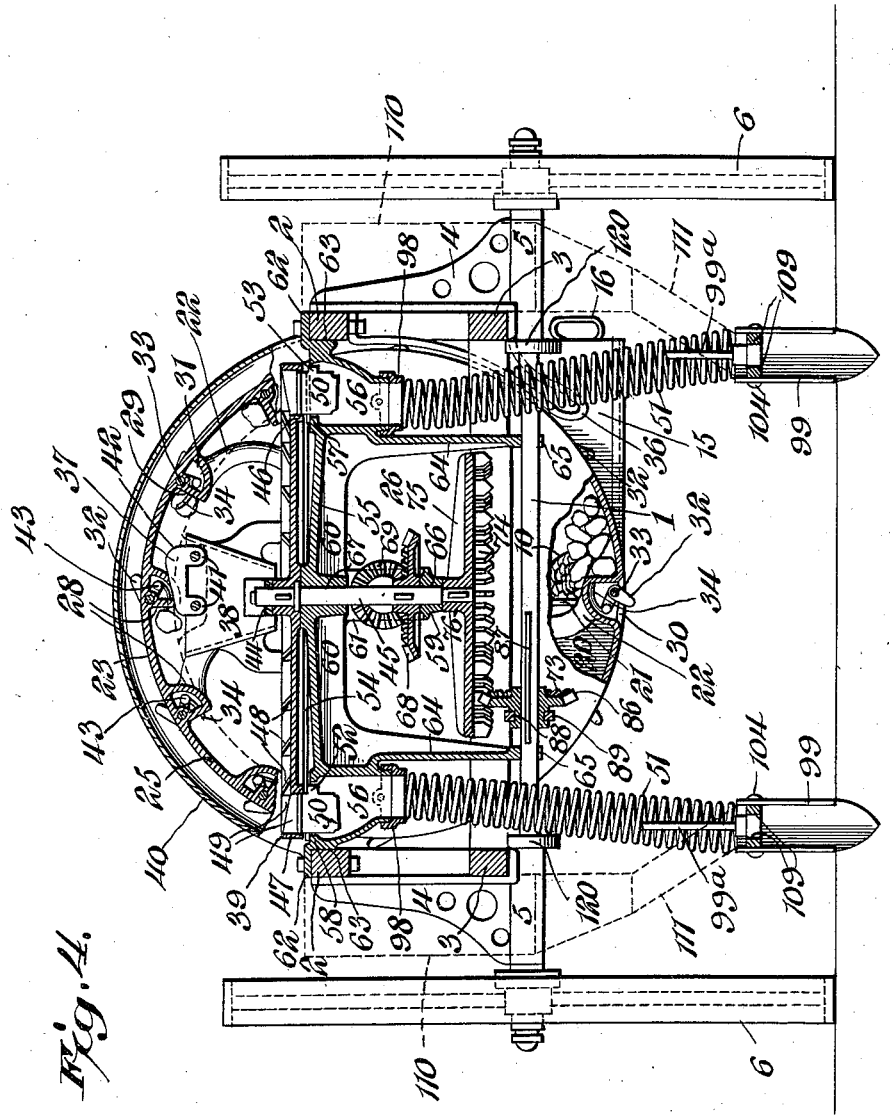

In the drawings:—Figure 1 is a plan view of a potato planter, constructed in accordance with this invention. Fig. 2 is a side elevation of the same. Fig. 3 is a longitudinal sectional view on the line 3—3 of Fig. 1. Fig. 4 is a transverse sectional view, taken substantially on the line 4—4 of Fig. 1. Fig. 5 is a similar view, taken on the line 5—5 of Fig. 1. Fig. 6 is a detail horizontal sectional view of the hopper taken substantially on the line 6—6 of Fig. 5. Fig. 7 is a detail view, illustrating the construction for operating the potato engaging devices. Fig. 8 is a detail perspective view of one of the potato engaging devices.

Like numerals of reference designate corresponding parts in all the figures of the drawings.

In the embodiment of the invention illustrated in the accompanying drawings, the machine is adapted for planting seed potatoes, but the improvements are applicable to machines for planting other seed. The frame of the machine is mounted upon a transverse shaft or axle 1 and comprises in its construction upper and lower horizontal side beams 2 and 3, spaced apart and connected by suitable transverse bars or beams. The upper and lower side bars or beams are also connected at an intermediate point by vertical pedestals 4, bolted or otherwise secured to the outer faces of the side bars or beams, and provided at their lower ends with bearings 5 for the reception of the transverse shaft or axle 1. Suitable traction or supporting wheels 6 are secured to the ends of the transverse shaft or axle, which is rotated in the forward movement of the machine. The machine is also equipped at its front with a suitable pole or tongue 7 to which the draft animals are connected.

Mounted within the front portion of the frame is a transversely disposed hopper 8, extending entirely across the frame and having its bottom 9 inclined both laterally and longitudinally. The side portions of the bottom extend downwardly and inwardly, as clearly shown in Fig. 5 of the drawings, and the bottom has a general inclination from front to rear, as clearly illustrated in Fig. 3, to direct the seed potatoes to an outlet 10, consisting of an opening formed in the rear wall of the hopper. The front and rear walls 11 and 12 of the hopper are preferably vertical, as shown, and the outlet opening is adapted to be varied in size to suit the size of the potatoes by a slidable cut-off 13, mounted in upper and lower horizontal guides or ways 14 of the rear wall 12, which is provided at the said ways with an extension 15. The slidable cut-off is equipped at its outer end with a suitable handle 16, and it is secured in its adjustment by a clamping device 17, consisting of a screw and nut, the cut-off being provided with a slot 18 through which the screw passes. The inner end 19 of the slidable cut-off is recessed and tapered toward the upper edge and is adapted to reduce the size of the opening to provide an outlet as small as desired. The hopper is preferably constructed of sheet metal, and the rear wall is provided at the outlet 10 with a resilient seed agitating member 20, formed by splitting the rear wall at the upper and lower edges of the said agitating member. The agitating member is approximately horizontal and is connected at its outer end with the body portion of the rear wall, and its inner end 21 is curved rearwardly beyond the plane of the rear wall of the hopper. It is arranged in the path of spokes 22 of a vertical rotary feed wheel 23. The spokes 22 in the rotation of the feed wheel are successively carried into contact with the concave face of the rearwardly curved terminal portion 21 of the agitating member, which is forced forwardly and inwardly thereby displacing a quantity of potatoes and loosening the same to cause the potatoes to pass freely through the outlet 10 of the hopper. The resiliency of the agitating member and the weight of the potatoes return the said member to its initial position. The continual vibration of the agitating member insures a positive feed of the seed potatoes through the outlet 10 and prevents any clogging of the material at this point.

The rotary feed wheel, which is adapted to pick up the potatoes, is disposed transversely of the planter and is mounted on the front end of a longitudinal shaft 24. It is provided with a rim 25 and is fitted against the rear face of the rear wall of the hopper, and it extends slightly below the bottom of the hopper and the outlet opening thereof, so that the potatoes will readily pass through the outlet into the space inclosed by the rim of the feed wheel and a segmental plate or wall 26 extending across the lower half of the feed wheel and suitably secured to the frame and provided at the top with a bearing 27 through which the longitudinal shaft 24 passes. By locating the rotary feed or pick-up wheel exteriorly of the hopper, as shown, instead of interiorly of the same as heretofore, there is no liability of the potatoes wedging between the walls of the hopper and the feed wheel and clogging or otherwise interfering with the operation thereof. The potatoes collect within the lower portion of the feed wheel, and the rim 25 thereof, which is approximately L-shaped in cross section to form an outer or rear annular flange 25ª, is provided at intervals with integral inwardly extending approximately quadrant-shaped pockets 28, forming interiorly arranged supporting shoulders 29, which are adapted to carry the potatoes upwardly when the feed wheel is rotated. Each of the quadrant-shaped pockets 28 is open at the periphery of the wheel at 30, and it is provided in the rear wall with a quadrant-shaped opening 31. In each of the pockets is mounted a potato engaging device 32, consisting of a substantially L-shaped lever, pivoted at its angle by a pin 33, or other suitable fastening device and having inner and outer arms, the inner arm being provided with a curved fork 34, consisting of a plurality of tines, adapted to extend through perforations 35 of the potato supporting wall or shoulder of the wall or pocket to pierce or stab a potato to retain the same on the shoulder when the latter through the rotation of the wheel is carried to the upper portion thereof and assumes an inclined position, as clearly illustrated at the upper right hand portion of the feed wheel in Fig. 4 of the drawings. When a pocket is at the bottom of the feed wheel, as shown in Fig. 4, the outer arm of the potato engaging device extends through the peripheral opening 30 of the pocket and the fork is withdrawn, being at the limit of its inward movement. The potato engaging device remains in this position until the pocket is carried upward beyond the mass of potatoes within the lower portion of the wheel, and the potato engaging device is then actuated by a curved spring 36, arranged in the path of the outer arm of the potato engaging device and adapted to swing the same inwardly. The inward movement of the L-shaped lever of the potato engaging device causes the fork to extend through the perforations of the supporting shoulder and pierce or spear the potatoes resting thereon. The curved spring, which is arranged concentric with a portion of the periphery of the feed wheel, forms a track or actuating guide for the potato engaging device, and it is preferably secured at its terminals to the longitudinal bars or beams at one side of the frame of the planter. The embedding of the fork in the potatoes is sufficient to retain the potato engaging device in its engaging position and in engagement with the potatoes until it is positively withdrawn by the action of a cam 37 to cause the potato engaging device to release the potato and permit the same to drop into a chute 38. The chute 38, which is located above the front portion of a horizontal rotary carrier 39, is hung from an arched guard or support 40, but it may be mounted in any other desired manner, and it is tapered downwardly, as clearly shown in Fig. 4. The cam 37, which consists of a flanged plate, is provided at the lower edge with ears 41, riveted or otherwise secured to the outer face of the rear wall of the chute. The upper edge of the cam is inclined downwardly in the direction of the rotation of the feed wheel, and its front end 42 is rounded and is arranged in the path of projecting portions 43 of the inner arms of the potato engaging devices. When a pocket reaches the chute, the projection 43 of the inner arm of the lever strikes the rounded end 42 of the cam 37 and rides upwardly over the same, and the lever is thereby swung outwardly withdrawing the fork from the potato and permitting the same to drop into the chute. The arched support or guard 40, which is substantially U-shaped in cross section, forms a peripheral casing for the upper portion of the feed wheel, and its sides or flanges are arranged at the front and back of the same. The chute is braced at the bottom by a horizontal bar 44, extending rearwardly from the chute and connected at its rear end to a vertical shaft 45 on which the rotary carrier 39 is mounted. The front end of the bar or brace 44 is bent upwardly at right angles and is riveted or otherwise secured to the chute.

The rotary carrier consists of a wheel preferably provided with spokes, and keyed or otherwise secured to the upper end of the vertical shaft 45, and it is provided at its periphery with concentric inner and outer rims 46 and 47, spaced apart and connected at intervals by integral radial partitions 48, forming the end walls of an annular series of seed receiving pockets 49. The rotary carrier is equipped at the bottom of the pockets 49 with hinged plates 50, adapted to open alternately for dropping the contents of the pockets into spouts 51, located at opposite sides of the machine, as clearly shown in Fig. 4 of the drawings. The bottom plates are hinged at one end and are provided alternately at their inner and outer edges with laterally projecting lugs 52 and 53, and they are maintained normally in a horizontal position by opposite approximately semicircular tracks 54, spaced apart at their terminals at the spouts 51 to permit the bottom plates to open thereat to drop the potatoes into the chutes. The rotary carrier is seated upon a support 55, and the curved tracks 54, which are located beneath the annular series of pockets, are secured at their terminals to the support 55, which is provided at opposite sides with vertical spout sections 56, open at the top and bottom and forming passages for the potatoes. The support 55 is provided at the opposite spout portions or sections with short curved tracks 57 and 58, arranged at the inner and outer walls of the spout sections, respectively, and adapted to coöperate with the inwardly and outwardly extending lugs to support the hinged bottom plates and to cause the alternate plates to open at the seed spouts. The curved tracks 54 hold the hinged bottom plates of the pockets closed until the pockets reach the place of discharge, and seed from one pocket will be dropped into the first seed spout and seed from the following pocket will be carried to the second seed spout. If it be desired to plant only one row, a short track section may be placed between the semi-circular tracks 54 to maintain all of the pockets closed at one of the seed spouts.

The support 55, which consists of a single casting, comprises a central depending bearing bracket 59, opposite laterally extending arms 60, and a central forwardly extending arm 61. The arm 60 extends to opposite sides of the planter frame, the spout sections 56 being integral with and located at the outer portions of the arm 60, which have terminal attaching flanges 62, seated upon and bolted to the upper side bars or beams of the planter frame. The arms are also provided with vertical faces 63, extending downwardly from the attaching flanges 62 and fitting against the inner faces of the side bars or beams 2. The support 55 is also provided with spaced depending arms 64, located at opposite sides of the bearing bracket and having bearing recesses 65 at their lower portions to fit the shaft or axle 1. The depending arms 64, which are located at the inner walls of the spout sections 56, are integral with the same and they straddle the shaft or axle and maintain the same in proper position with relation to the mechanism mounted on the support. The arms of the support are flanged to secure the desired strength, and the depending bearing bracket 59, which is approximately U-shaped, is composed of front and rear sides and a connecting bottom portion, and it is provided at the bottom with a central bearing 66, arranged in alinement with an upper central bearing 67 of the body portion of the support. The lower and upper bearings 66 and 67 of the support receive the vertical shaft 45, and the bottom of the depending bearing bracket supports a horizontal bevel gear 68, which meshes with a vertical bevel pinion 69, mounted on the rear end of the longitudinal shaft 24. The bevel gears 68 and 69 are located within the depending bearing bracket, and the longitudinal shaft 24 is arranged in a bearing 70 of the front side of the bracket and in a front bearing 71 of the central forwardly extending arm 61 of the support. The forwardly extending arm 61 is provided at an intermediate point with laterally extending ears or attaching portions 72, and is bolted or otherwise secured to the upper face of one of the transverse beams of the planter frame. The front end of the arm 61 is curved downwardly, and is fitted against the rear end of the hub of the vertical feed wheel and supports the front end of the shaft 24, as clearly shown in Fig. 3 of the drawings. The vertical bevel gear 69 is preferably one-half the size of the horizontal bevel gear 68, so that the feed wheel will travel twice as fast as the rotary carrier, which has twice as many pockets as the potato engaging devices of the feed wheel, but the potato engaging devices of the feed wheel and the pockets of the rotary carrier may be proportioned in any other desired manner, and the gearing made to correspond so that a potato will be deposited in each of the pockets of the rotary carrier by the feed wheel. The bearing bracket 59 also forms a support for an approximately V-shaped supporting bracket 72ª, consisting of a horizontal top portion and an inclined bracing portion, connected together at the rear end of the bracket and secured to and supporting the rear one of the semi-circular tracks 54. The front ends of the horizontal and inclined portions of the bracket 72ª are secured to ears, projecting from the rear side of the bearing bracket 59.

Motion is communicated from the shaft or axle to the vertical shaft 45 by means of a vertical bevel pinion 73, and a horizontal multi-bevel gear 74, keyed or otherwise secured to the lower end of the vertical shaft. The pinion 73 is slidably interlocked with the shaft or axle 1 by a key or feather 87, and its hub is provided with an annular groove 88 and is engaged by a forked arm 89 of a shifting lever 90, arranged approximately horizontal and fulcrumed on a bracket 91, and adapted to be oscillated to remove the slidable bevel pinion 73 inwardly or outwardly. The bracket 91, which is mounted on one of the transverse beams of the planter frame, is provided with a forwardly projecting flange 92, which supports the pivot bolt 93 of the shifting lever 90. The bracket is provided with a rearwardly extending flange or portion 94, and the lever 90 is secured in its adjustment by a pin 96, which pierces the flange or portion 94 and the said lever 90. The shaft or axle is maintained in alinement with respect to the multi-bevel gear by the depending arms 64 of the main support 55, which supports all of the gearing with the exception of the pinion of the shaft or axle, and as the feed wheel and the carrier together with the gearing for actuating the same are all mounted on the same support, they may be easily alined and any twisting of the members of the frame of the planter will not affect the relative alinement of the planting mechanism. By mounting the parts in this manner, they may also be assembled before securing the support to the frame of the planter, and greater strength, durability and efficiency are thereby secured besides greatly lessening the cost of manufacture, also an easy running machine not liable to get out of order in its gear driven parts is produced.

The seed spouts 51 preferably consist of coiled springs, as shown, and their upper ends are detachably secured to the spout sections 56 of the support 55 by collars 98, fitted on the lower ends of the spout sections 56 and secured to the same by clamping screws, or other suitable means. The lower ends of the spouts are connected with furrow opening shoes 99, mounted on plow beams 100 and having spaced sides for guiding the seed potatoes into the furrow opened by the furrow opening shoe or share. The furrow opening share or shoe 99 may be of any preferred construction, and the beams 100, which are pivotally connected at their inner ends to the planter frame, are equipped with colters 101, adjustably mounted on the beams in advance of the furrow opening shoes. The spring seed spouts are yieldable and are adapted to adjust themselves to the up and down movement of the furrow opening shoes due to the irregularity of the soil, or any adjustment of the said shoes, which are guided in their upward and downward movement by upright bars or members 99ª, connected at their lower ends with the furrow opening shoes and having their upper portions arranged in suitable guides 99ᵇ. The furrow opening shoes are adapted to be raised and lowered by substantially L-shaped lifting levers 102, pivotally mounted on the planter frame at opposite sides thereof and having short arms connected by links or rods 103 with the furrow opening shoes by short transverse rods or pivots 104, which also connect the lower ends of the guides 99ᵇ with the furrow opening devices 99. The lifting levers 102 are equipped with suitable dogs or detents 105, arranged to engage toothed segments 106 and controlled by latch levers mounted on the lifting levers at the handle portions thereof. The short transverse pins or pivots also connect covering disks 107 with the furrow opening shoes. The covering disks are arranged in pairs, the members of each pair being set at an angle to each other and converging rearwardly, as clearly shown in Fig. 1 of the drawings. Each pair is mounted on a short shaft 108, having its terminal portions set at an angle to the intermediate central portion, which is connected with the pivot 104 by links or bars 109. Any other form of covering device, however, may be employed, as will be readily understood.

The soil is fertilized simultaneously with the planting of the seed, and the machine is equipped at opposite sides with fertilizer hoppers or containers 110, having depending tubular portions or spouts 111 extending to the furrow opening shoes and discharged into the space between the sides of the same. The fertilizer hoppers are located exteriorly of the frame of the planter and are provided at their inner sides with horizontal attaching flanges 112, seated upon and secured to the upper edges of the upper side bars or beams 2 of the frame of the planter, as clearly shown in Fig. 1 of the drawings.

Having thus fully described my invention, what I claim as new and desire to secure by Letters Patent, is:—

1. A seed planter including a hopper having an inclined bottom and provided in one of its walls with an outlet located at the lower end of the inclined bottom, and a rotary feeding wheel arranged exteriorly of the hopper at the said outlet and extending below the plane of the same to permit the material from the hopper to flow freely into the rotary feed wheel, the latter being provided with a continuous rim and having an annular flange at the outer side edge of the rim and provided also at the inner face of the rim with potato engaging devices arranged to operate in the space between the said flange and the said hopper.

2. A seed planter including a hopper provided in one of its walls with an outlet, a shaft, a rotary feed wheel mounted on the shaft and arranged exteriorly of the hopper at the said outlet and provided with a continuous rim and having spokes connected therewith, and a segmental plate hung from the shaft and spaced from the hopper and arranged at the lower portion of the feed wheel and coöperating with the lower portion of the rim to confine the material within the feed wheel.

3. A seed planter including a hopper provided with an inclined bottom and having an outlet at its rear wall, a horizontal shaft, a segmental plate hung from the shaft and arranged in spaced relation with the rear walls of the hopper and located opposite the said outlet, and a rotary feed wheel mounted on the shaft and having a continuous rim and operating in the space between the rear wall of the hopper and the segmental plate.

4. A seed planter including a hopper provided in one of its walls with an outlet, a movable agitator located at the said outlet, and a rotary feed wheel arranged exteriorly of the hopper at the said outlet and provided with means arranged to contact with the agitator at intervals of its rotary movement to prevent the material of the hopper from clogging at the outlet.

5. A seed planter including a hopper provided in one of its walls with an outlet, a rotary feed wheel arranged exteriorly of the hopper at the said outlet and having spokes, and a movable agitator arranged at the outlet and projecting exteriorly of the hopper into the path of the spokes, whereby it is actuated by the feed wheel.

6. A seed planter including a hopper provided in one of its walls with an outlet, a feed wheel arranged exteriorly of the hopper at the outlet in position to receive the material therefrom, and a resilient agitator located at the outlet and projecting into the path of and adapted to be engaged by the feed wheel.

7. A seed planter including a hopper provided with an outlet opening and having its wall adjacent to the outlet opening provided with a resilient vibratory portion, which constitutes one wall of the outlet opening, and a rotary feed wheel provided with means arranged to contact with the said vibratory portion and actuated through the rotary movement of the feed wheel.

8. A seed planter including a hopper provided in one of its walls with an outlet, and having a resilient agitator formed by partially severing a portion of the wall at the outlet and arranged to be vibrated for agitating the material at the said outlet, and a feed wheel located exteriorly of the hopper and arranged to engage and actuate the agitator.

9. A seed planter including a hopper provided with a metallic wall having an outlet opening and split adjacent to the outlet opening to form a resilient vibratory portion, the free end of the vibratory portion being extended exteriorly of the hopper, and a feed wheel arranged exteriorly of the hopper in position to receive the material from the outlet and having spokes arranged to engage and actuate the said vibratory portion to agitate the material at the outlet.

10. A seed planter including a hopper provided in its rear wall with an outlet and split at one side thereof to form a vibrating agitator, a slidable cut-off mounted at the opposite side of the outlet, and a rotary feed wheel arranged exteriorly of the hopper at the said outlet and having means for engaging the agitator.

11. A seed planter including a rotary feed wheel provided with inwardly extending peripheral brackets forming supporting shoulders and having side and peripheral openings, potato engaging devices pivotally mounted in the brackets and provided with means for holding the potatoes on the supporting shoulders and having outer arms arranged to project through the peripheral openings, said potato engaging devices being also provided with laterally projecting portions extending through the side openings, means arranged in the path of the outer arms for moving the potato engaging devices into engagement with the potatoes, a chute, and means arranged at the chute and located in the path of the laterally projecting portions for operating the potato engaging devices to release the potatoes.

12. A seed planter including a rotary feed wheel provided with inwardly extending peripheral brackets forming supporting shoulders and having side and peripheral openings, potato engaging devices pivotally mounted in the brackets and provided with means for holding the potatoes on the supporting shoulders and having outer arms arranged to project through the peripheral openings, said potato engaging devices being also provided with laterally projecting portions extending through the side openings, means arranged in the path of the outer arms for moving the potato engaging devices into engagement with the potatoes, a chute, and a cam arranged at the chute in the path of the laterally projecting portions of the potato engaging devices to operate the latter for releasing the potatoes to cause the same to drop into the chute.

13. A seed planter including a rotary feed wheel provided with inwardly extending peripheral brackets forming supporting shoulders and having side and peripheral openings, potato engaging devices pivotally mounted in the brackets and provided with means for holding the potatoes on the supporting shoulders and having outer arms arranged to project through the peripheral openings, said potato engaging devices being also provided with laterally projecting portions extending through the side openings, means arranged in the path of the outer arms for moving the potato engaging devices into engagement with the potatoes, a chute, and a tapering plate mounted upon one of the walls of the chute and having a rounded edge arranged in the path of the potato engaging devices for operating the latter to release the potatoes.

14. A seed planter including a frame, a shaft or axle supporting the frame, a main support consisting of a single casting extending entirely across the frame and secured to the side portions thereof and provided with spaced depending arms connected with the axle, vertical and horizontal shafts mounted on the said support, a rotary feed wheel carried by the horizontal shaft, a rotary carrier seated on the support and connected with the vertical shaft, and gearing connecting the vertical and horizontal shafts and the vertical shaft with the shaft or axle.

15. A seed planter including a frame, an axle extending across the frame and supporting the same, a main support consisting of a single casting extending across the frame and secured to the same at the sides thereof and having spaced depending arms connected with the shaft or axle, said support being also provided at an intermediate point between the depending arms with a depending bearing bracket, vertical and horizontal shafts mounted in bearings of the bracket, gears located within the bracket and connecting the vertical and horizontal shafts, a feed wheel mounted on the horizontal shaft, a rotary carrier mounted on the bracket and connected with the vertical shaft, and gearing for transmitting motion from the shaft or axle to the vertical shaft.

16. A seed planter including a frame, a shaft or axle supporting the frame, a main support consisting of a single casting extending entirely across the frame and secured to the same at opposite sides thereof and provided with a depending bearing bracket and having a longitudinal arm terminating in the bearing space from the bracket, vertical and longitudinal shafts mounted in the bearing bracket, the longitudinal shaft being also supported in the bearing of the said arm, a rotary feed wheel mounted on the longitudinal shaft, a carrier seated upon the support and connected with the vertical shaft, and gearing connecting the vertical and longitudinal shafts, and other gearing connecting the vertical shaft with the shaft or axle.

17. A seed planter including a frame, an axle supporting the frame, a main support consisting of a single casting extending entirely across the frame and secured to the same and provided at spaced points with depending arms connected with the axle, said frame being also provided at an intermediate point between the depending arms with a central depending bracket and having a longitudinal arm terminating in a bearing, vertical and longitudinal shafts mounted in the bearing bracket, the longitudinal shaft being supported in the bearing of the longitudinal arm, a rotary feed wheel mounted on the longitudinal shaft, a rotary carrier seated upon the support and connected with a vertical shaft, gearing connecting the vertical and longitudinal shafts, and other gearing for connecting the vertical shaft with the axle.

18. A seed planter including a frame, a main support consisting of a single casting and provided with laterally extending arms having depending integral spout sections, a rotary carrier seated upon the support and operating over the said spouts, a rotary feed wheel, and gearing mounted on the support for rotating the carrier and the feed wheel.

19. A seed planter including a frame, a main support consisting of a casting extending across and secured to the frame at opposite sides thereof and provided with a central bearing bracket and having a forwardly extending arm terminating in a bearing, vertical and longitudinal shafts mounted in the bearing bracket, the longitudinal shaft being also supported by the bearing of the said arm, a hopper having an outlet, a feed wheel located exteriorly of the hopper at the said outlet and mounted on the longitudinal shaft, a segmental plate hung from the longitudinal shaft and arranged at the back of the feed wheel, a vertical shaft also mounted in the bearing bracket, a rotary carrier seated on the support and connected with the vertical shaft, and gearing connected with the shafts for rotating the feed wheel and the carrier.

In testimony, that I claim the foregoing as my own, I have hereto affixed my signature in the presence of two witnesses.

ALEXIS R. PRIBIL.

Witnesses:
 ARTHUR D. CAMPBELL,
 ALFRED G. MASTERS.

Copies of this patent may be obtained for five cents each, by addressing the "Commissioner of Patents, Washington, D. C."